United States Patent
Kawata

(10) Patent No.: US 8,878,973 B2
(45) Date of Patent: Nov. 4, 2014

(54) SOLID-STATE IMAGING DEVICE

(75) Inventor: Hidenobu Kawata, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 774 days.

(21) Appl. No.: 13/093,322

(22) Filed: Apr. 25, 2011

(65) Prior Publication Data

US 2012/0033121 A1   Feb. 9, 2012

(30) Foreign Application Priority Data

Aug. 5, 2010 (JP) ................ 2010-176368

(51) Int. Cl.
- H04N 3/14 (2006.01)
- H04N 5/335 (2011.01)
- H04N 5/217 (2011.01)
- H04N 5/378 (2011.01)

(52) U.S. Cl.
CPC ..................... *H04N 5/378* (2013.01)
USPC ............. 348/300; 348/241; 348/308

(58) Field of Classification Search
None
See application file for complete search history.

(56) References Cited

U.S. PATENT DOCUMENTS

| 2006/0214821 A1* | 9/2006 | Roh ................ 341/50 |
| 2009/0284629 A1* | 11/2009 | Nakao et al. ........... 348/294 |
| 2010/0085438 A1* | 4/2010 | Richardson ............ 348/222.1 |

FOREIGN PATENT DOCUMENTS

| JP | 5-244466 | 9/1993 |
| JP | 2002-237957 | 8/2002 |
| JP | 2004-88515 | 3/2004 |
| JP | 2010-41520 | 2/2010 |

\* cited by examiner

*Primary Examiner* — Sinh Tran
*Assistant Examiner* — Jason Flohre
(74) *Attorney, Agent, or Firm* — Oblon, Spivak, McClelland, Maier & Neustadt, L.L.P.

(57) ABSTRACT

According to one embodiment, a pixel that outputs a photo-electrically-converted pixel signal, a column ADC circuit that converts the pixel signal output from the pixel into a digital value, a test-signal generating unit that generates a test signal with which the column ADC circuit is tested, and a switching circuit that switches between the pixel signal output from the pixel and the test signal generated in the test-signal generating unit to input to the column ADC circuit are included.

19 Claims, 4 Drawing Sheets

FIG.5A
FIG.5B
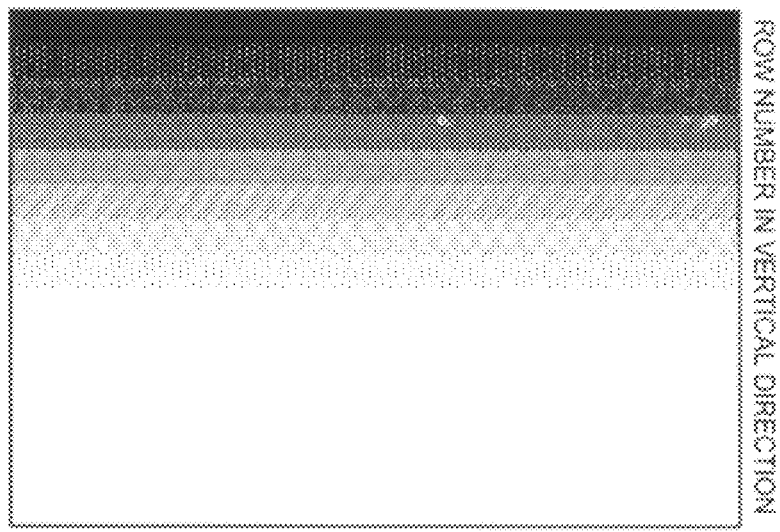
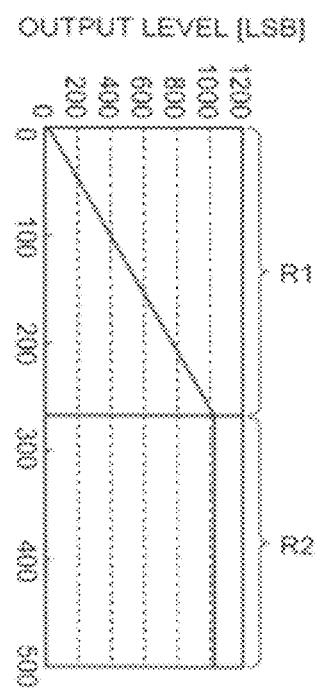

SOLID-STATE IMAGING DEVICE

CROSS-REFERENCE TO RELATED APPLICATIONS

This application is based upon and claims the benefit of priority from the prior Japanese Patent Application No. 2010-176368, filed on Aug. 5, 2010; the entire contents of which are incorporated herein by reference.

FIELD

Embodiments described herein relate generally to a solid-state imaging device.

BACKGROUND

There is a CMOS image sensor that includes column ADC circuits each of which digitally converts signals read out from pixels for a corresponding column. For improving an image quality of the CMOS image sensor, linearity of this column ADC circuit needs to be evaluated and a stable evaluation method is required.

BRIEF DESCRIPTION OF THE DRAWINGS

FIG. 5A is a diagram illustrating an example of an image for one frame obtained when the test signal in FIG. 4 is used; and FIG. 5B is a diagram illustrating an example of an output level in a vertical direction when the test signal in FIG. 4 is used.

DETAILED DESCRIPTION

In general, according to one embodiment, a pixel, an ADC circuit, a test-signal generating unit, and a switching circuit are included. The pixel outputs a photoelectrically-converted pixel signal. The ADC circuit converts the pixel signal output from the pixel into a digital value. The test-signal generating unit generates a test signal with which the ADC circuit is tested. The switching circuit switches between the pixel signal output from the pixel and the test signal generated in the test-signal generating unit to input to the ADC circuit.

A solid-state imaging device according to the embodiments will be explained below with reference to the drawings. The present invention is not limited to the following embodiments.

First Embodiment

Figure 1:
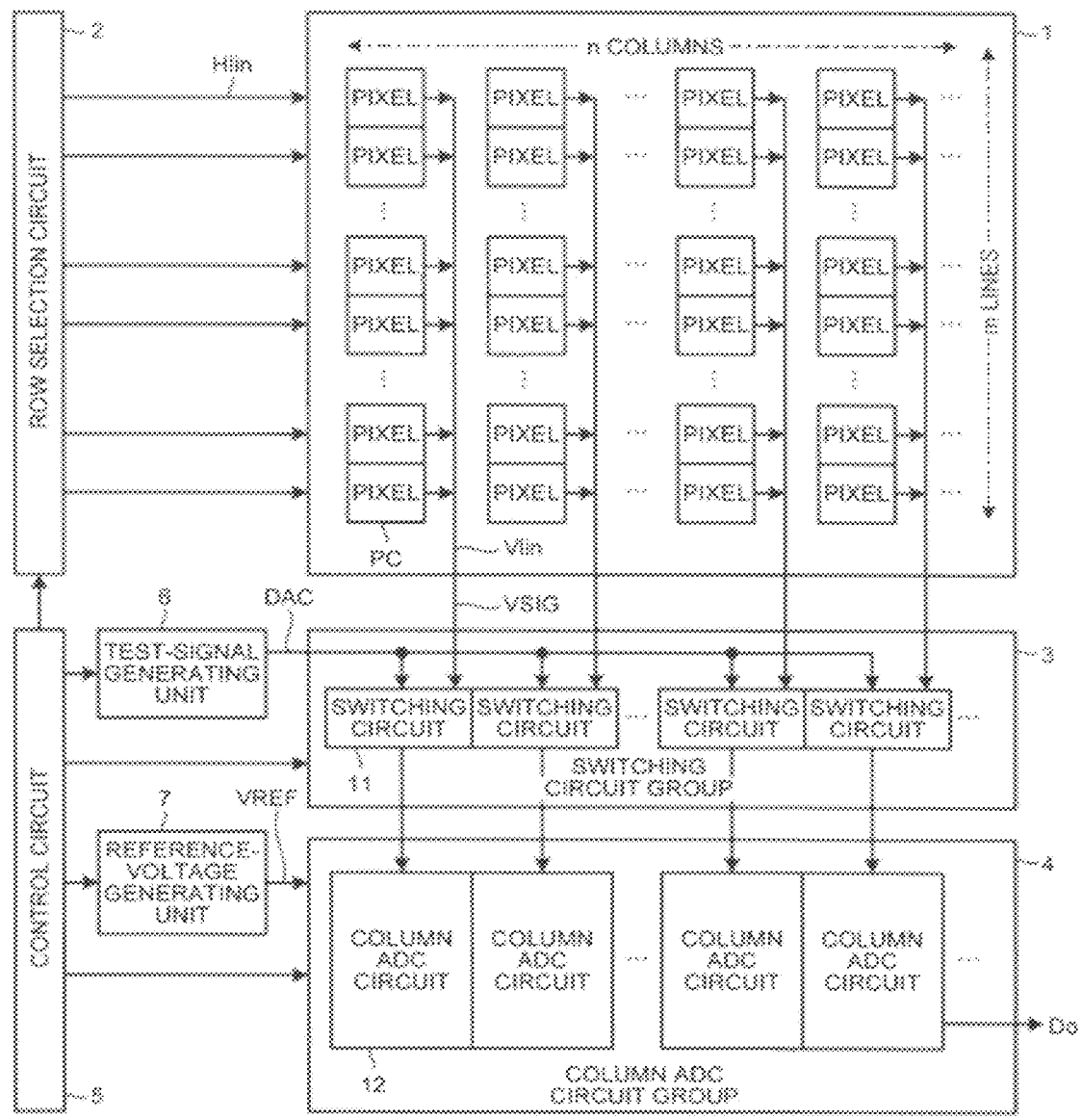
FIG. 1 is a block diagram illustrating a schematic configuration of a solid-state imaging device according to a first embodiment.

FIG. 1 is a block diagram illustrating a schematic configuration of a solid-state imaging device according to the first embodiment.

In FIG. 1, this solid-state imaging device includes a pixel array unit 1 in which pixels PC that accumulate photoelectrically-converted charges are arranged in a matrix manner in a row direction and a column direction, a row selection circuit 2 that selects the pixel PC to be read in a vertical direction, a column ADC circuit group 4 that detects a signal component of each pixel PC in a CDS and converts it into a digital value, a test-signal generating unit 6 that generates a test signal DAC for testing the column ADC circuit group 4, a switching circuit group 3 that switches between a pixel signal VSIG output from the pixel PC and the test signal DAC generated in the test-signal generating unit 6 and inputs a signal to the column ADC circuit group 4, a reference-voltage generating unit 7 that generates a reference voltage VREF that is compared with the pixel signal VSIG and the test signal DAC at the time of operation of the column ADC circuit group 4, and a control circuit 5 that controls the row selection circuit 2, the switching circuit group 3, the column ADC circuit group 4, the test-signal generating unit 6, and the reference-voltage generating unit 7.

The pixel array unit 1, the row selection circuit 2, the switching circuit group 3, the column ADC circuit group 4, the control circuit 5, the test-signal generating unit 6, and the reference-voltage generating unit 7 can be formed on a single semiconductor chip.

In the pixel array unit 1, horizontal control lines Hlin that perform a readout control of the pixels PC are provided in the row direction and vertical signal lines Vlin that transmit signals read out from the pixels PC are provided in the column direction.

The column ADC circuit group 4 includes column ADC circuits 12 for respective columns, and each of the column ADC circuits 12 can detect a signal component of each pixel PC in the CDS for each column and convert it into a digital value.

The switching circuit group 3 includes switching circuits 11 for respective columns, and each of the switching circuits 11 can switch between the pixel signal VSIG output from the pixel PC and the test signal DAC generated in the test-signal generating unit 6 for each column and input a signal into the column ADC circuit 12. Moreover, each of the switching circuits 11 can switch to the pixel signal VSIG when performing imaging via the pixel PC and can switch to the test signal DAC when testing a corresponding column ADC circuit 12.

The test-signal generating unit 6 makes the test signal DAC to transition from a reset level to a signal level in synchronization with the readout timing of the signal level from the pixel PC. The test-signal generating unit 6 can make the voltage output range of the test signal DAC larger than the voltage output range of the pixel signal VSIG.

The control circuit 5 can make the column ADC circuit 12 to operate based on the output timing of the pixel signal VSIG when the signal is switched to the pixel signal VSIG in the switching circuit 11 and make the column ADC circuit 12 to operate based on the output timing of the test signal DAC when the signal is switched to the test signal DAC in the switching circuit 11.

When performing imaging via the pixel PC, the signal is switched in the switching circuit 11 so that the pixel signal VSIG is input to the column ADC circuit 12. Then, the pixels PC are scanned in the vertical direction by the row selection circuit 2, so that the pixel PC in the row direction is selected and the pixel signal VSIG read out from the pixel PC is transmitted to the column ADC circuit 12 via the vertical signal line Vlin.

Then, the pixel signal VSIG at the time of reset and signal readout is compared with the reference voltage VREF in the column ADC circuit 12, whereby the reset level and the signal readout level are sampled from the pixel signal VSIG of each pixel PC. Then, the difference between the reset level and the signal readout level is calculated to detect the signal component of each pixel PC in the CDS, which is converted into the digital value, whereby output data Do is generated.

On the other hand, when testing the column ADC circuit 12, the signal is switched in the switching circuit 11 so that the test signal DAC is input to the column ADC circuit 12.

Then, in the column ADC circuit 12, the reset level and the signal readout level are sampled from the test signal DAC in synchronization with the readout timing of the signal level from the pixel PC. Then, the difference between the reset level and the signal readout level is calculated to detect the signal level of the test signal DAC in the CDS, which is converted into the digital value, whereby the output data Do is generated.

Figure 2:
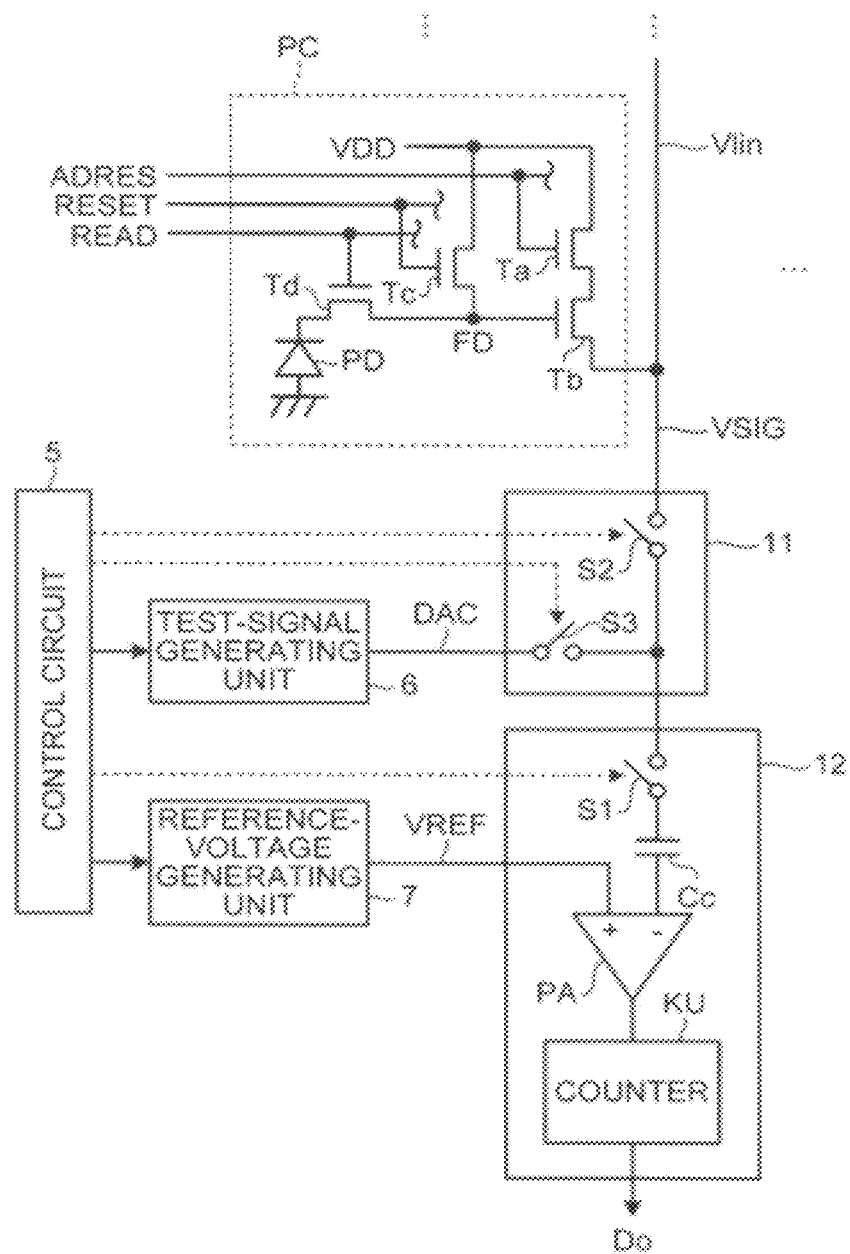
FIG. 2 is a block diagram illustrating a detailed configuration example of the solid-state imaging device in FIG. 1.

FIG. 2 is a block diagram illustrating a detailed configuration example of the solid-state imaging device in FIG. 1.

In FIG. 2, in each pixel PC, a photodiode PD, a row select transistor Ta, an amplifying transistor Tb, a reset transistor Tc, and a readout transistor Td are provided. A floating diffusion FD is formed as a detection node at a connection point of the amplifying transistor Tb, the reset transistor Tc, and the readout transistor Td.

The source of the readout transistor Td is connected to the photodiode PD and a readout signal READ is input to the gate of the readout transistor Td. Moreover, the source of the reset transistor Tc is connected to the drain of the readout transistor Td, a reset signal RESET is input to the gate of the reset transistor Tc, and the drain of the reset transistor Tc is connected to a power supply potential VDD. Furthermore, a row selection signal ADRES is input to the gate of the row select transistor Ta, and the drain of the row select transistor Ta is connected to the power supply potential VDD. Moreover, the source of the amplifying transistor Tb is connected to the vertical signal line Vlin, the gate of the amplifying transistor Tb is connected to the drain of the readout transistor Td, and the drain of the amplifying transistor Tb is connected to the source of the row select transistor Ta.

The horizontal control lines Hlin in FIG. 1 can transmit the readout signal READ, the reset signal RESET, and the row selection signal ADRES to the pixels PC for each row.

Moreover, the column ADC circuit 12 includes a switch S1 that connects the column ADC circuit 12 to the vertical signal line Vlin, a capacitor Cc that holds the reset level of a signal output from each pixel PC, a comparator PA that compares the pixel signal VSIG and the test signal DAC with the reference voltage VREF, and a counter KU that calculates the difference between the reset level and the signal readout level in the CDS by performing up-counting and down-counting based on the comparison result of the comparator PA for each column.

Moreover, the switching circuit 11 includes a switch S2 that connects and disconnects the vertical signal line Vlin to and from the column ADC circuit 12 and a switch S3 that connects and disconnects the test-signal generating unit 6 to and from the column ADC circuit 12.

Figure 3:
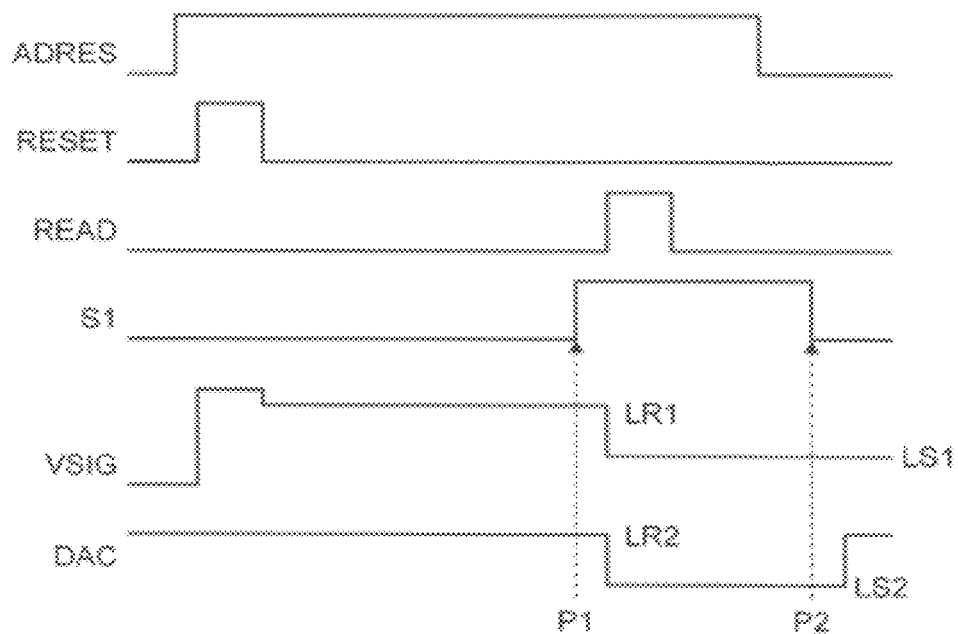
FIG. 3 is a timing chart illustrating waveforms in respective units in the solid-state imaging device in FIG. 1.

FIG. 3 is a timing chart illustrating waveforms in respective units of the solid-state imaging device in FIG. 1.

In FIG. 3, when performing imaging via the pixel PC, the switch S3 is turned off to disconnect the test-signal generating unit 6 from the column ADC circuit 12 and the switch S2 is turned on to connect the vertical signal line Vlin to the column ADC circuit 12. Moreover, the switch S1 is turned on in synchronization with the timing of the column selection.

Then, when the row selection signal ADRES is the low level, the row select transistor Ta becomes the off-state, so that the pixel signal VSIG is not output to the vertical signal line Vlin. At this time, when the readout signal READ and the reset signal RESET become the high level, the readout transistor Td is turned on, so that charges accumulated in the photodiode PD are discharged to the floating diffusion FD and are then discharged to the power supply potential VDD via the reset transistor Tc.

After the charges accumulated in the photodiode PD are discharged to the power supply potential VDD, when the readout signal READ becomes the low level, accumulation of effective signal charges is started in the photodiode PD.

Next, when the row selection signal ADRES becomes the high level, the row select transistor Ta of the pixel PC is turned on and the power supply potential VDD is applied to the drain of the amplifying transistor Tb.

Then, when the reset signal RESET becomes the high level in the state where the row select transistor Ta is on, the reset transistor Tc is turned on and extra charges generated in the floating diffusion FD due to leakage current or the like are reset. Then, the voltage in accordance with the reset level of the floating diffusion FD is applied to the gate of the amplifying transistor Tb, and the voltage of the vertical signal line Vlin follows the voltage applied to the gate of the amplifying transistor Tb, so that the pixel signal VSIG in a reset level LR1 is output to the vertical signal line Vlin.

Then, the pixel signal VSIG in the reset level LR1 is input to the comparator PA via the capacitor Cc to be compared with the reference voltage VREF. Then, the counter KU performs a down-counting operation based on the comparison result thereof, so that the pixel signal VSIG in the reset level LR1 is converted into the digital value to be held in the counter KU.

Next, when the readout signal READ becomes the high level in the state where the row select transistor Ta of the pixel PC is on, the readout transistor Td is turned on and charges accumulated in the photodiode PD are transferred to the floating diffusion FD. Then, the voltage in accordance with the signal readout level of the floating diffusion FD is applied to the gate of the amplifying transistor Tb and the voltage of the vertical signal line Vlin follows the voltage applied to the gate of the amplifying transistor Tb, so that the pixel signal VSIG in a signal readout level LS1 is output to the vertical signal line Vlin.

Then, the pixel signal VSIG in the signal readout level LS1 is input to the comparator PA via the capacitor Cc to be compared with the reference voltage VREF. Then, the counter KU performs an up-counting operation based on the comparison result thereof, so that the difference between the pixel signal VSIG in the reset level LR1 and the pixel signal VSIG in the signal readout level LS1 is converted into the digital value to be output as the output data Do via the counter KU.

On the other hand, when testing the column ADC circuit 12, the switch S3 is turned on to connect the test-signal generating unit 6 to the column ADC circuit 12 and the switch S2 is turned off to disconnect the vertical signal line Vlin from the column ADC circuit 12. Moreover, the switch S1 is turned on in synchronization with the timing of the column selection.

At the timing at which the column selection is performed by the row selection signal ADRES, the test signal DAC is set to a reset level LR2 and is input to the comparator PA via the capacitor Cc. Then, in the period from the fall of the reset signal RESET to the rise of the readout signal READ, the counter KU performs the down-counting operation based on the comparison result with the reference voltage VREF, so that the test signal DAC in the reset level LR2 is converted into the digital value to be held in the counter KU (P1).

Next, the test signal DAC is transitioned from the reset level LR2 to a signal readout level LS2 at the timing of rising of the readout signal READ and is input to the comparator PA via the capacitor Cc. Then, after the readout signal READ falls, the counter KU performs the up-counting operation based on the comparison result with the reference voltage VREF, so that the difference between the test signal DAC in the reset level LR2 and the test signal DAC in the signal readout level LS2 is converted into the digital value to be output as the output data Do via the counter KU.

When examining the linearity of the output data Do of the column ADC circuits 12, the difference between the reset level LR2 and the signal readout level LS2 of the test signal DAC is changed linearly and it is possible to check whether the value of the output data Do at this time changes linearly.

Consequently, it is not needed to apply the test signal DAC from the outside of the solid-imaging device in synchronization with the operation timing of the column ADC circuits 12 for examining the linearity of the output data Do of the column ADC circuit 12. Therefore, there is no need to connect an external application apparatus that applies the test signal DAC to the input terminal of the solid-imaging device, so that an input voltage can be prevented from changing due to a parasitic capacitance, a contact resistance, and the like, enabling to stably evaluate the linearity of the column ADC circuit 12.

Second Embodiment

Figure 4:
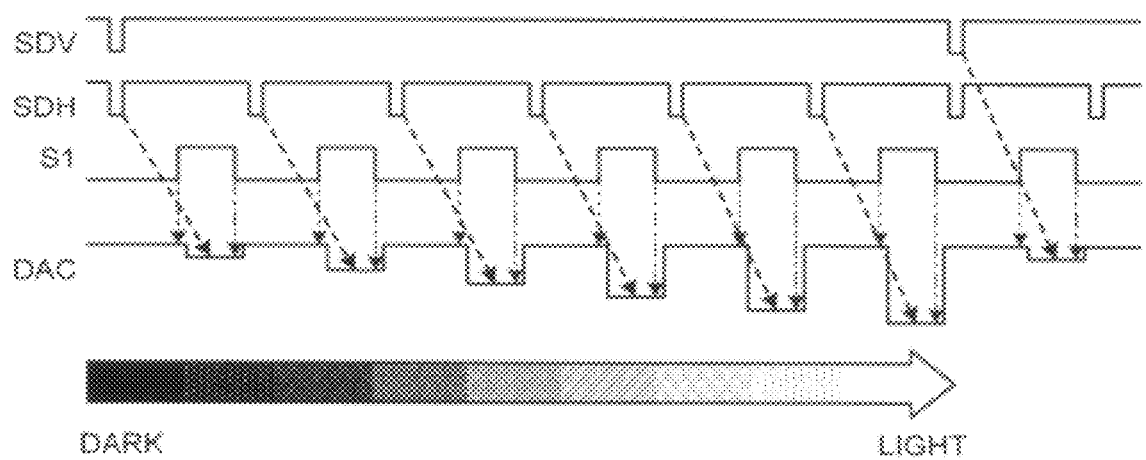
FIG. 4 is a timing chart illustrating a waveform of a test signal used in a solid-state imaging device according to a second embodiment.

FIG. 4 is a timing chart illustrating the waveform of the test signal used in a solid-state imaging device according to the second embodiment.

In FIG. 4, the test signal DAC is set so that the output voltage differs by a constant value for each row in synchronization with a horizontal synchronizing signal SDH. In the test signal DAC, the output voltage is initialized to the original level in synchronization with a vertical synchronizing signal SDV.

The amount of change in the output voltage at this time can be a value for one bit or can be a value for two or more bits. Moreover, it is applicable that the amount of change in the output voltage for each row is variable. Furthermore, it is applicable to provide a register for specifying the amount of change in the control circuit 5.

FIG. 5A is a diagram illustrating an example of an image for one frame obtained when the test signal in FIG. 4 is used, and FIG. 5B is a diagram illustrating an example of an output level in a vertical direction when the test signal in FIG. 4 is used.

In FIGS. 5A and 5B, the test signal DAC in FIG. 4 is set so that the output level from the column ADC circuit 12 becomes linear in a region R1 that is the first few rows in a frame and is saturated in a region R2 that is the remaining few rows.

Then, the linearity of the column ADC circuit group 4 can be examined for each column by causing the column ADC circuit group 4 to perform processing for one frame by testing the output levels from the column ADC circuit 12 when the test signal DAC in FIG. 4 is input to the column ADC circuit 12. Moreover, the output voltage of the test signal DAC is initialized to the original level in synchronization with the vertical synchronizing signal SDV, so that images for one frame when the test signal DAC is input to the column ADC circuits 12 can be continuously displayed without preparing a frame memory.

In the above second embodiment, explanation is given for the method of generating the test signal DAC so that the output level in the region R1 from the column ADC circuit 12 rises in accordance with the increase of the row number, however, the test signal DAC can be generated so that the output level in the region R1 from the column ADC circuit 12 decreases in accordance with the increase of the row number.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
   a pixel that outputs a photoelectrically-converted pixel signal;
   an ADC circuit that converts the pixel signal output from the pixel into a digital value;
   a test-signal generating unit that generates a test signal with which the ADC circuit is tested; and
   a switching circuit that switches between the pixel signal output from the pixel and the test signal generated in the test-signal generating unit to input to the ADC circuit,
   wherein the test-signal generating unit makes an output voltage to be different by a constant value for each row in synchronization with a horizontal synchronizing signal.

2. The solid-state imaging device according to claim 1, wherein the switching circuit switches to the pixel signal when performing imaging via the pixel and switches to the test signal when testing the ADC circuit.

3. The solid-state imaging device according to claim 2, further comprising a control circuit that makes the ADC circuit to operate based on an output timing of the pixel signal when being switched to the pixel signal in the switching circuit and makes the ADC circuit to operate based on an output timing of the test signal when being switched to the test signal in the switching circuit.

4. The solid-state imaging device according to claim 3, further comprising a reference-voltage generating unit that generates a reference voltage to be compared with the pixel signal and the test signal at a time of operation of the ADC circuit.

5. The solid-state imaging device according to claim 1, wherein the test-signal generating unit makes the test signal to transition from a reset level to a signal level in synchronization with a readout timing of a signal level from the pixel.

6. The solid-state imaging device according to claim 1, wherein a voltage output range of the test signal is larger than a voltage output range of the pixel signal.

7. The solid-state imaging device according to claim 1, wherein the test-signal generating unit initializes the output voltage in synchronization with a vertical synchronizing signal.

8. The solid-state imaging device according to claim 7, wherein the test-signal generating unit is configured such that an amount of change of the output voltage of each row is variable.

9. The solid-state imaging device according to claim 1, wherein a difference between a reset level and a signal readout level of the test signal changes linearly.

10. The solid-state imaging device according to claim 1, wherein the test signal is set such that an output level from the ADC circuit becomes linear in a region that is a few rows in a frame and is set such that an output level from the ADC circuit is saturated in a region that is a remaining few rows.

11. The solid-state imaging device according to claim 10, wherein the test signal is repeatedly input while being initialized in synchronization with a vertical synchronizing signal.

12. The solid-state imaging device according to claim 1, wherein the switching circuit includes
   a first switch that performs connection between the pixel and the ADC circuit, and
   a second switch that performs connection between the test-signal generating unit and the ADC circuit.

13. The solid-state imaging device according to claim 12, wherein the ADC circuit is provided for each column.

14. The solid-state imaging device according to claim 13, wherein the ADC circuit includes
   a capacitor that holds a reset level of a signal output from the pixel,
   a comparator that compares the pixel signal and the test signal with a reference voltage, and
   a counter that calculates a difference between a reset level and a signal readout level in a CDS by performing up-counting and down-counting based on a comparison result by the comparator.

15. The solid-state imaging device according to claim 14, wherein the pixel includes
   a photodiode that performs photoelectric conversion,
   a floating diffusion that holds charge accumulated in the photodiode,
   a row select transistor that performs a row selection based on a row select signal,
   a reset transistor that resets the floating diffusion based on a reset signal,
   a readout transistor that reads out a signal from the photodiode to the floating diffusion based on a readout signal, and
   an amplifying transistor that amplifies the signal read out from the photodiode to the floating diffusion.

16. The solid-state imaging device according to claim 15, wherein the test signal is set to a reset level at a timing at which a column selection is performed with the row select signal.

17. The solid-state imaging device according to claim 16, wherein in a period from fall of the reset signal to rise of the readout signal, the test signal in the reset level is converted into a digital value by the counter performing a down-counting operation based on a comparison result with the reference voltage to be held in the counter.

18. The solid-state imaging device according to claim 17, wherein the test signal is transitioned from the reset level to the signal readout level at a timing at which the readout signal rises.

19. The solid-state imaging device according to claim 18, wherein a difference between the test signal in the reset level and the test signal in the signal readout level is converted into a digital value by the counter performing an up-counting operation based on a comparison result with the reference voltage after the readout signal falls to be output as output data via the counter.

* * * * *